(12) United States Patent
Kim et al.

(10) Patent No.: US 9,276,860 B2
(45) Date of Patent: Mar. 1, 2016

(54) DISTRIBUTED DATA CENTER TECHNOLOGY

(71) Applicant: Microsoft Corporation, Redmond, WA (US)

(72) Inventors: Changhoon Kim, Bellevue, WA (US); Yousef A. Khalidi, Bellevue, WA (US); Guhan Suriyanarayanan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 214 days.

(21) Appl. No.: 13/801,964

(22) Filed: Mar. 13, 2013

(65) Prior Publication Data
US 2014/0280818 A1    Sep. 18, 2014

(51) Int. Cl.
*H04L 12/803* (2013.01)
*G06F 9/50* (2006.01)

(52) U.S. Cl.
CPC .............. *H04L 47/125* (2013.01); *G06F 9/505* (2013.01)

(58) Field of Classification Search
CPC ............ G06F 15/16; G06F 7/00; G06F 15/12
USPC ....................................................... 709/223
See application file for complete search history.

(56) References Cited

U.S. PATENT DOCUMENTS

| | | | |
|---|---|---|---|
| 6,249,801 B1 | 6/2001 | Zisapel et al. | |
| 6,647,408 B1 | 11/2003 | Ricart et al. | |
| 7,822,889 B2 | 10/2010 | Arimilli et al. | |
| 2010/0036956 A1 | 2/2010 | Nishikawa | |
| 2010/0191783 A1 | 7/2010 | Mason et al. | |
| 2011/0153727 A1 | 6/2011 | Li | |
| 2012/0226733 A1* | 9/2012 | Kim et al. | ..... 709/201 |
| 2014/0258374 A1* | 9/2014 | Suryanarayanan et al. | .. 709/203 |

OTHER PUBLICATIONS

K.P. Bubendorfer, "Resource Based Policies for Load Distribution", Victoria University of Wellington, Aug. 1996, 215 pages. AVailable at <<http://www.mcs.vus.ac.nz/comp/graduates/archives/msc/KrisBubendorfer.ps.gz>>.
International Search Report & Written Opinion for PCT Patent Application No. PCT/US2014/020834, Mailed Date: Jun. 3, 2014, Filed Date: Mar. 5, 2014, 12 pages.
"Red Hat Makes Step Toward Common Cloud API in Partnership with DMTF", Published on: Aug. 30, 2010, Available at: http://www.thectoforum.com/content/red-hat-makes-step-toward-common-cloud-api-partnership-dmtf.
Macvitti, Lori, "Cloud Balancing: The Evolution of Global Server Load Balancing", Retrieved on: Dec. 28, 2011, Available at: http://www.f5.com/pdf/white-papers/cloud-balancing-wp.pdf.

(Continued)

*Primary Examiner* — David Lazaro
*Assistant Examiner* — Zia Khurshid
(74) *Attorney, Agent, or Firm* — Nicholas Chen; Doug Barker; Micky Minhas

(57) ABSTRACT

A regional data center system corresponding to a particular region of the world. The data center system includes multiple data centers, each configured such that region-specific requests for services may be satisfied by any of the data centers. One or more of the data centers may also perform load balancing on received region-specific request. In order to perform load balancing, the receiving data center may itself process the requests, but in some cases may determine that the request is to be processed by another data center within the regional data center system.

22 Claims, 7 Drawing Sheets

(56) References Cited

OTHER PUBLICATIONS

"CloudAround Music Player", Retrieved on: Dec. 28, 2011, Available at: http://www.androidzoom.com/android_applications/media_and_video/cloudaround-music-player_blhfk.html.

"Virtual Machine Mobility with Vmware VMotion and Cisco Data Center Interconnect Technologies", Retrieved on: Dec. 28, 2011, Available at: http://www.cisco.com/en/US/solutions/collateral/ns340/ns517/ns224/ns836/white_paper_c11-557822.pdf.

Alkagupta, "Alka Gupta's Cloud Virtualization and Cloud Computing", Published on: Aug. 26, 2009, Available at: http://blogs.oracle.com/WebScale/entry/cloudify_your_enterprise_two_emerging.

"Preserving Research Data to Enable Long-term Investigation and Discovery", Retrieved on: Dec. 28, 2011, Available at: http://www.canarie.ca/templates/news/docs/HEPLegacyData.pdf.

"Written Opinion Received for PCT Application No. PCT/US2014/020834", Mailed Date: Feb. 6, 2015, 6 Pages.

* cited by examiner

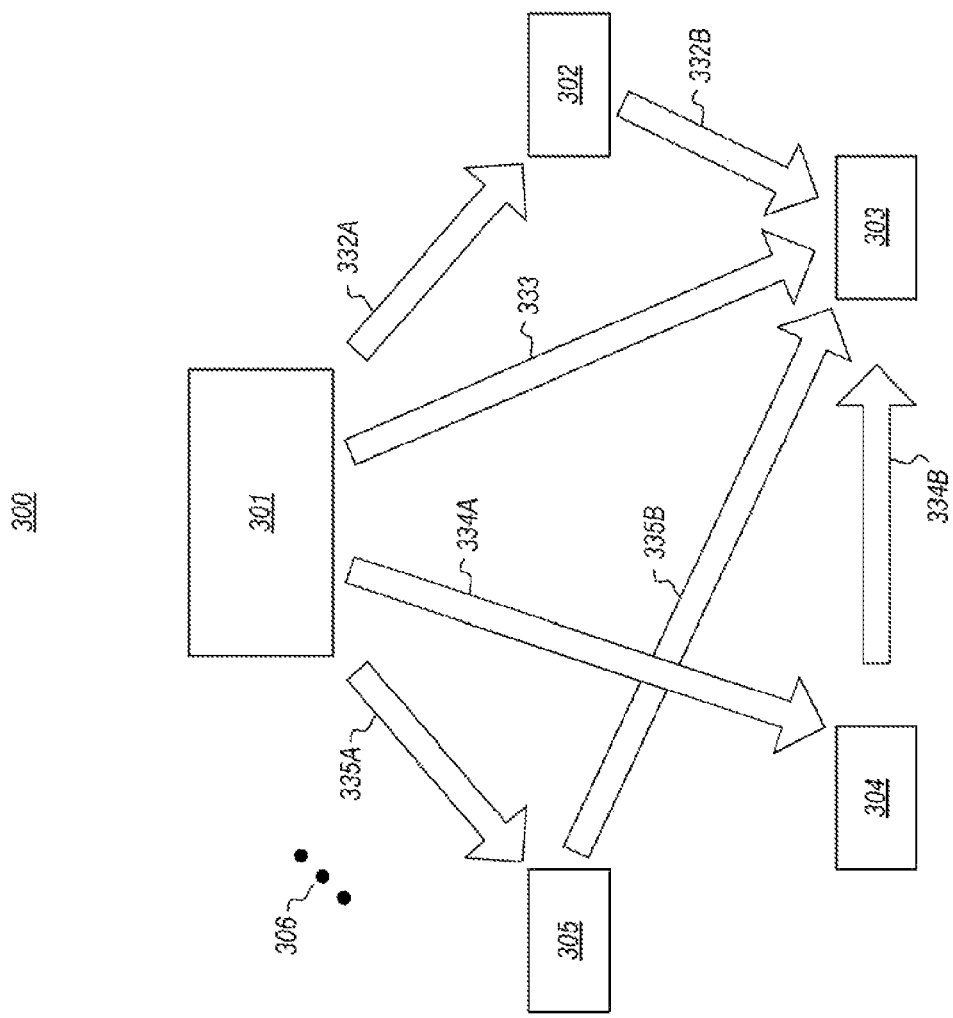

DISTRIBUTED DATA CENTER TECHNOLOGY

BACKGROUND

"Cloud computing" is a model for enabling ubiquitous, convenient, on-demand network access to a shared pool of configurable computing resources (e.g., networks, servers, storage, applications, and services). The shared pool of configurable computing resources can be rapidly provisioned via virtualization and released with low management effort or service provider interaction, and then scaled accordingly. A cloud computing model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). An environment that implements the cloud computing model is often referred to as a cloud computing environment.

A cloud computing environment may include a number of data centers, each having an enormous amount of computing resources such as processing power, memory, storage, bandwidth, and so forth. A data center might be, for example, a sophisticated business location employing hundreds of individuals, and including perhaps hundreds or thousands or racks of servers. Each data center is located within a particular region of the world, and for cloud services that are sensitive to region or latency, tend to support cloud services offered in that particular region. While a data center might be quite large, as the demand for cloud computing increases in that region, the utilization of the data center can also increase to the point where most of the data center is utilized.

BRIEF SUMMARY

At least one embodiment described herein relates to a regional data center system corresponding to a particular region of the world. The data center system includes multiple data centers, each configured such that region-specific requests for services may be satisfied by any of the data centers. One or more of the data centers may also perform load balancing on received region-specific request. In order to perform load balancing, the receiving data center may itself process the requests, but in some cases may determine that the request is to be processed by one or more other data centers within the regional data center system. The use of such a regional data center system allows the system to act as a single data center, while reducing the risk that any one of the data centers will run out of computing resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 3C illustrates the regional data center system and the associated flows involved for region-specific service requests for which the receiving data center selects another data center as the processing data center;

DETAILED DESCRIPTION

In accordance with at least one embodiment described herein, a regional data center system is described. The regional data center includes multiple data centers corresponding to a particular region of the world such that each constituent data center can process region-specific requests for services. One or more of the data centers may also perform load balancing on received region-specific request. In order to perform load balancing, the receiving data center may itself process the requests, but in some cases may determine that the request is to be processed by one or more other data centers within the regional data center system.

Some introductory discussion of a computing system will be described with respect to FIG. 1. Then, the principles of the regional data center will be described with respect to FIGS. 2 through 5.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
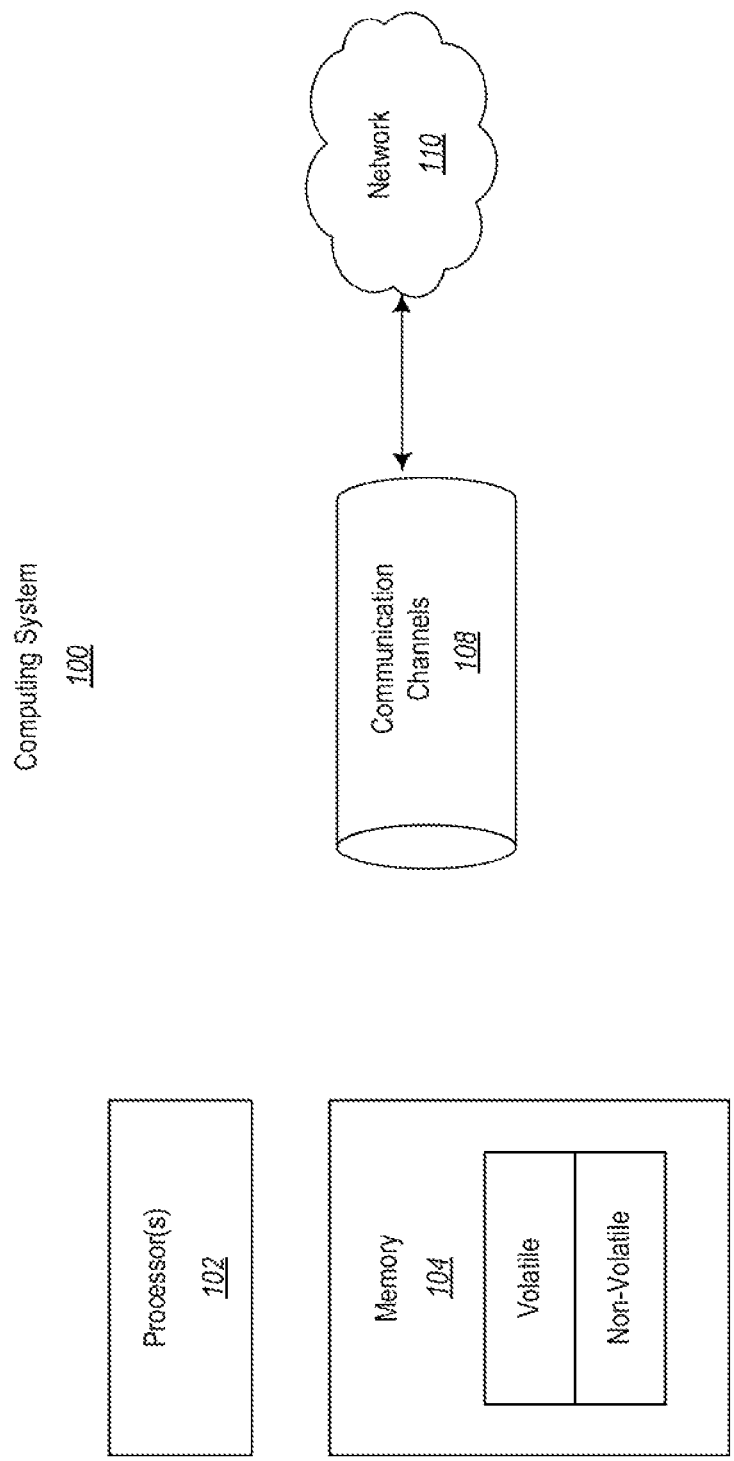
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module"

or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
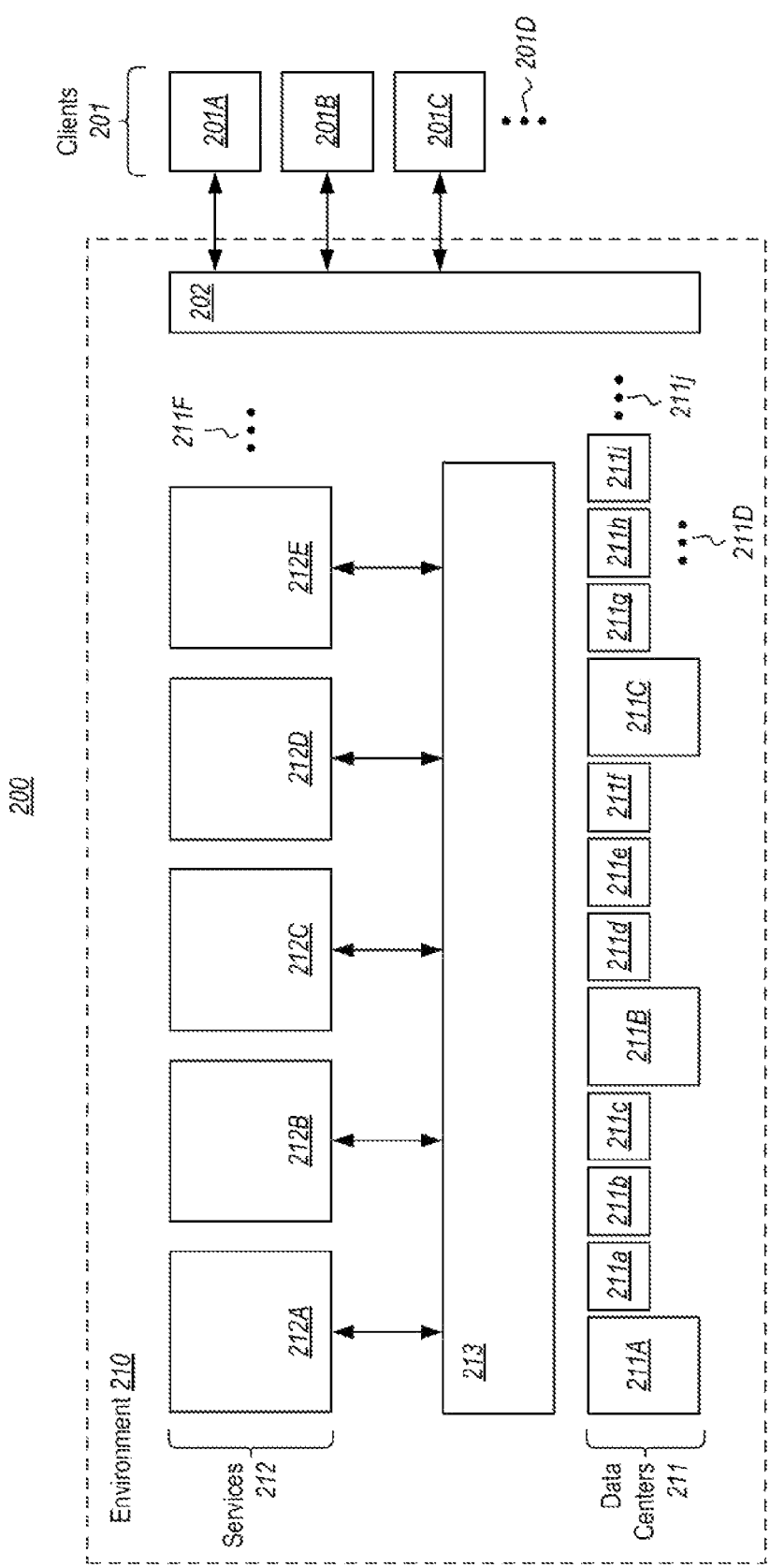
FIG. 2 abstractly illustrates an environment in which multiple clients interact with a cloud computing environment that has multiple data centers.

FIG. 2 abstractly illustrates an environment 200 in which the principles described herein may be employed. The environment 200 includes multiple clients 201 interacting with a cloud computing environment 210 using an interface 202. The environment 200 is illustrated as having three clients 201A, 201B and 201C, although the ellipses 201D represent that the principles described herein are not limited to the number of clients interfacing with the cloud computing environment 210 through the interface 202. The cloud computing environment 210 may provide services to the clients 201 on-demand and thus the number of clients 201 receiving services from the cloud computing environment 210 may vary over time.

Each client 201 may, for example, be structured as described above for the computing system 100 of FIG. 1. Alternatively or in addition, the client may be an application or other software module that interfaces with the cloud computing environment 210 through the interface 202. The interface 202 may be an application program interface that is defined in such a way that any computing system or software entity that is capable of using the application program interface may communicate with the cloud computing environment 210.

Cloud computing environments may be distributed and may even be distributed internationally and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The system 210 includes multiple data centers 211, each including corresponding computing resources, such as processing, memory, storage, bandwidth, and so forth. The data centers 211 include larger data centers 211A, 211B and 211C, though the ellipses 211D represent that there is no restriction as to the number of origin data centers within the data center group 211. Also, the data centers 211 include smaller data centers 211a through 211i, although the ellipses 211j represent that there is no restriction as to the number of smaller data centers within the data center group 211. Each of the data centers 211 may include perhaps a very large number of host computing systems that may be each structured as described above for the computing system 100 of FIG. 1. The data centers 211 may be distributed geographically, and perhaps even throughout the world if the cloud computing environment 200 spans the globe.

The cloud computing environment 200 also includes services 212. In the illustrated example, the services 200 include five distinct services 212A, 212B, 212C, 212D and 212E, although the ellipses 212F represent that the principles described herein are not limited to the number of service in the system 210. A service coordination system 213 communicates with the data centers 211 and with the services 212 to thereby provide services requested by the clients 201, and other services (such as authentication, billing, and so forth) that may be prerequisites for the requested service.

Figure 3A:
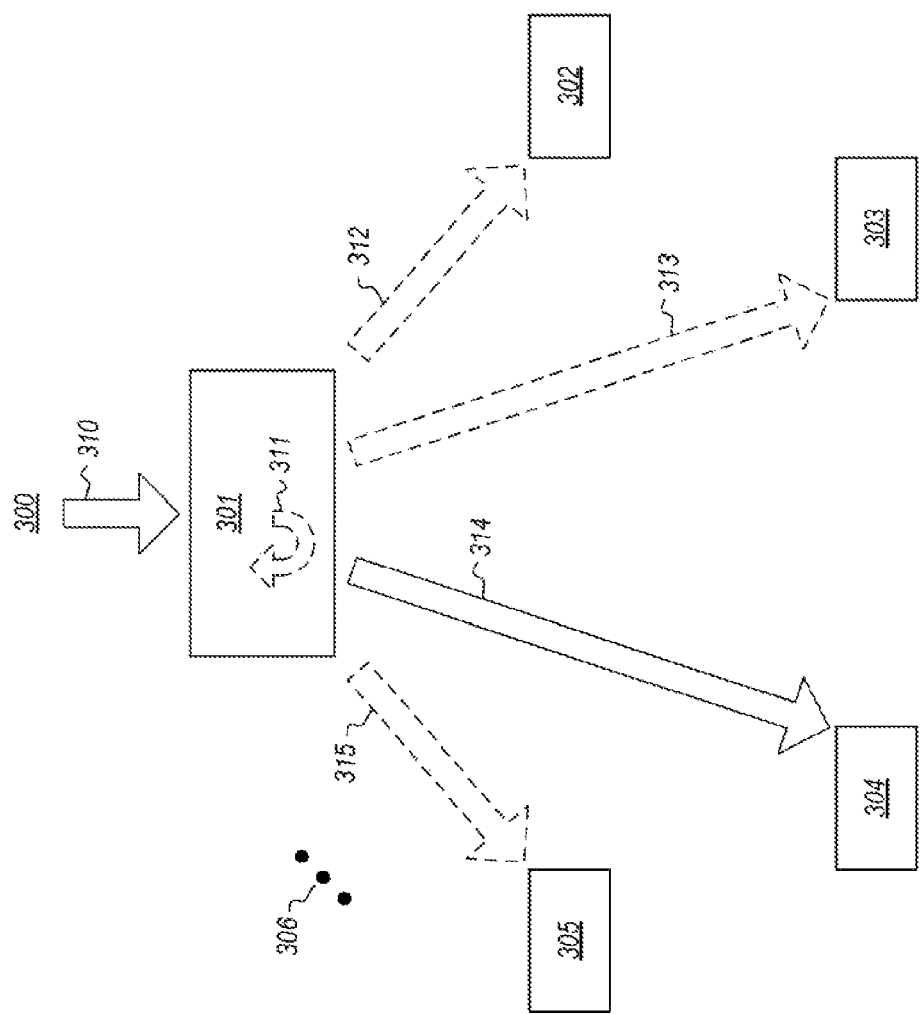
FIG. 3A illustrates a regional data center system that includes multiple data centers that are each configured such that requests for services corresponding to a particular region may be processed and satisfied by any of the data centers within the regional data center system.

FIG. 3A illustrates a regional data center system 300 that includes multiple data centers that are each configured such that requests for services corresponding to a particular region (hereinafter also referred to as "region-specific requests" or "region-specific service requests") may be processed and satisfied by any of the data centers within the regional data center system. The illustrated system 300 is shown as including five data centers 301 through 305. However, this is for example purposes only. The ellipses 306 represent that the principles described here apply to any data center system that includes multiple constituent data centers, regardless of the number of such constituent data centers.

The communication between each of the data centers is verified to operate within a particular latency envelope such that communication between the data centers operates with some probability with a latency below a particular threshold. The particular latency threshold is preferably small enough that the average customer that submits the region-specific service requests cannot significantly distinguish the regional data center system consists of multiple distributed data centers, as opposed to a single data center. For instance, the latency threshold might be on the order of a few milliseconds or less. Thus, even though the data centers 301 through 306 might perhaps be distributed many miles from each other, they might seem to operate as a single data center from the viewpoint of the customer.

The data centers need not be the same size, but may be sized in any manner desired by the owner and/or administrator of the regional data center system 300. For instance, in one embodiment, the region may start with but a single larger data center. Then, as demand grows in that particular region, additional data centers may be added. In that case, perhaps the additional data centers may be smaller in compute power than the original larger data center. For instance, in FIG. 3, data center 301 is shown as larger than the smaller data centers 302 through 305. Perhaps the data center 301 was the original data center of the region, and the data centers 302 through 305 were subsequently added as demand increased in the particular region. In one embodiment, at least one of data centers 302 through 305 might have less than one half of the compute power than the original data center 301. A method for adding additional data centers to the regional data center system will be described below with respect to FIG. 5. For instance, data center 301 might be the data center 211A or FIG. 2, while data centers 302 through 305 might be, for example, data centers 211a, 211b, 211c and 211d of FIG. 2. Alternatively, the data center system 300 may be conceptually thought of as being a single data center from the viewpoint of the service coordination system 213.

Figure 4:
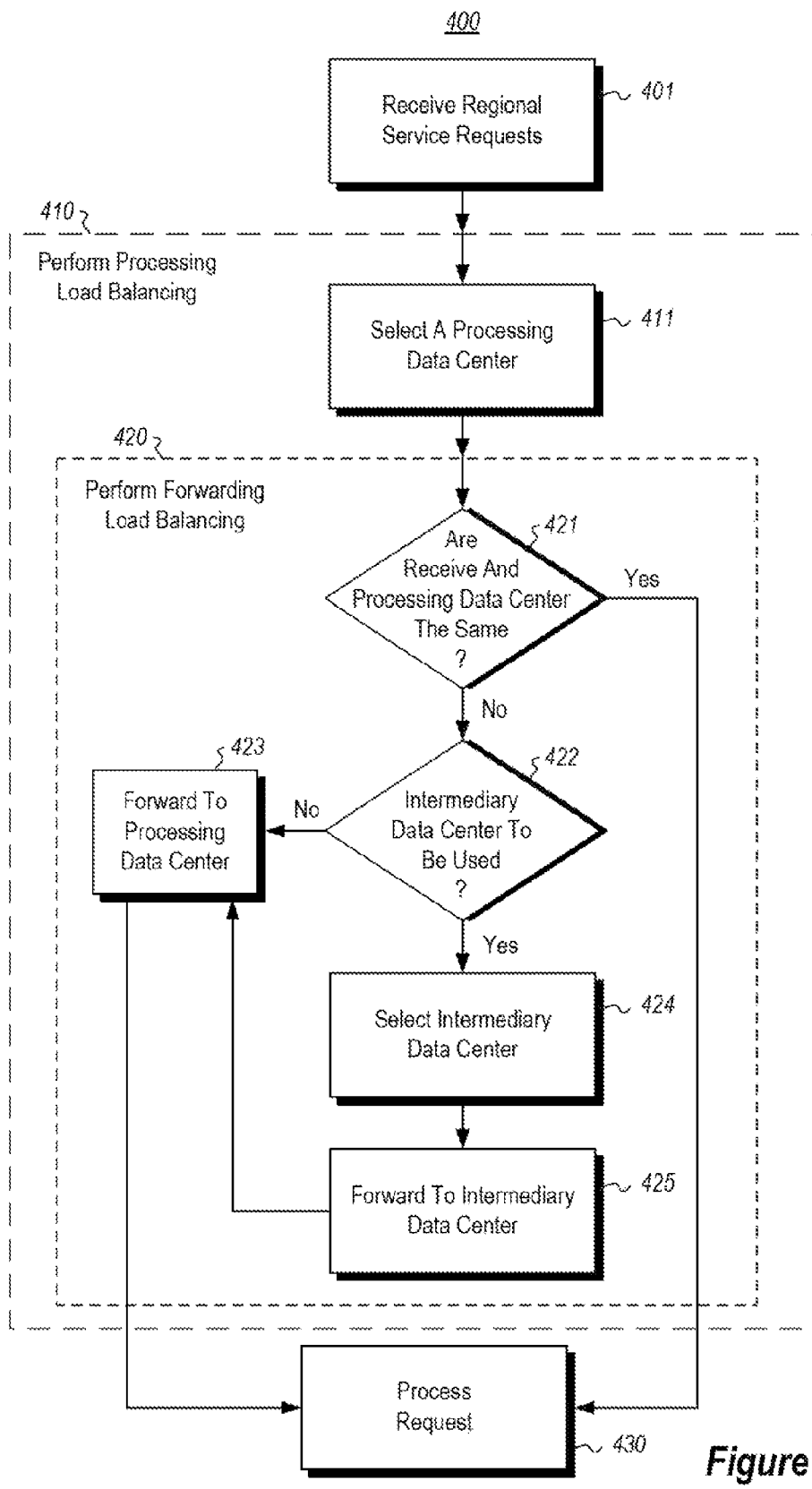
FIG. 4 illustrates a flowchart of a method for any of the data centers within a regional data center system to perform load balancing on region-specific request corresponding to the particular region.

FIG. 4 illustrates a flowchart of a method 400 for any of the data centers within a regional data center system to perform load balancing on region-specific request corresponding to the particular region. As the method 400 may be performed within the regional data center system 300 of FIG. 3A, the method 400 will now be described with frequent reference to the FIG. 3A.

For instance, a data center of the regional data center 300 performs the method 400. In FIG. 3A, the data center 301 performs the method with respect to region-specific service requests that the data center 301 receives. However, the principles described herein are not limited to the particular subset of the data centers that are configured to receive region-specific service requests for the particular region served by the regional data center system 300. For instance, perhaps data center 301 is the only data center of the regional data center system 300 that receives region-specific service requests to be satisfied within the regional data center system 300. At the other extreme, perhaps all data centers of the regional data center system 300 may receive region-specific service requests to be satisfied within the regional data center system 300. In between, perhaps only a subset of the data centers of the regional data center system 300 may receive region-specific service requests to be satisfied within the regional data center system 300. Regardless, the method 400 may be performed concurrently by any data center that is configured to receive such requests within the regional data center system 300.

Figure 3B:
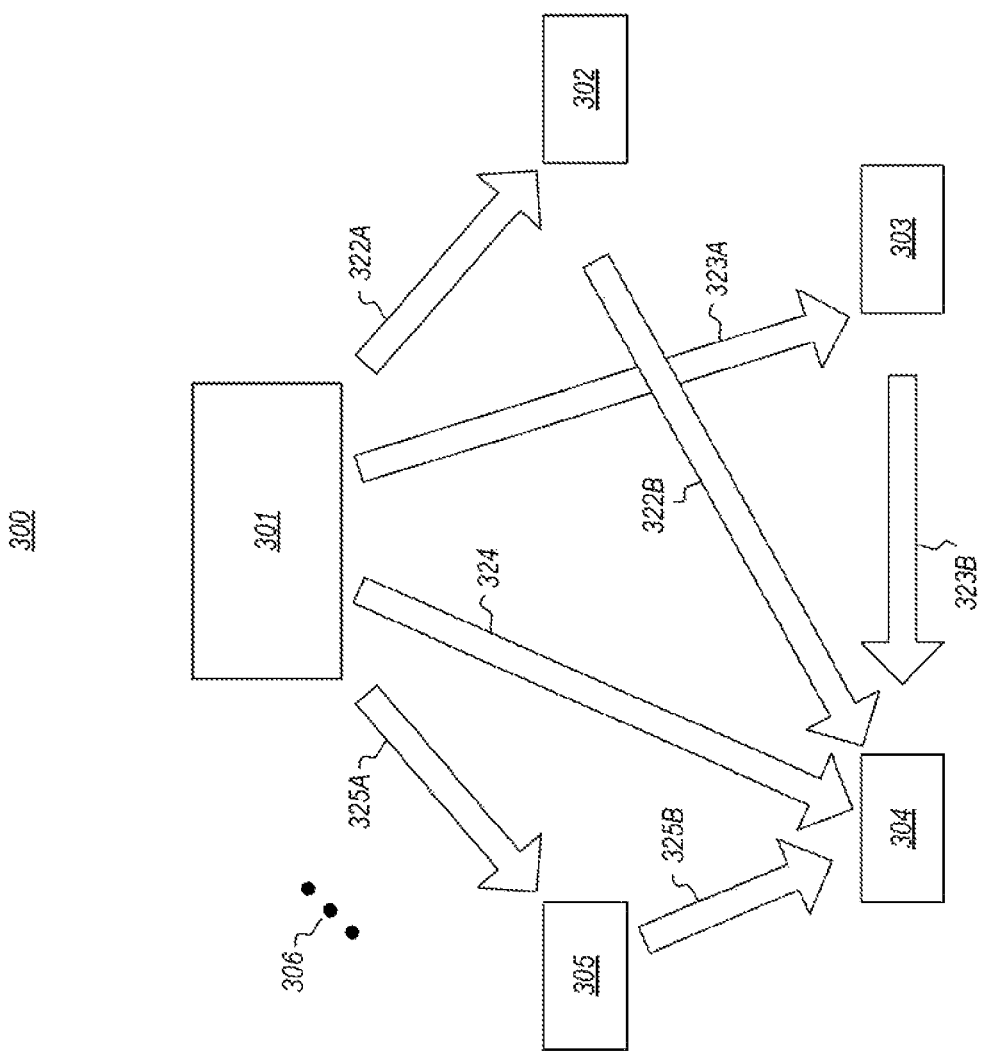
FIG. 3B illustrates the associated flows involved to process region-specific service requests in which the receiving data center selects a processing data center.

Referring to the specific example of FIGS. 3A and 3B, the data center 301 receives region-specific service requests (act 401) for the particular region served by the regional data center system 300 as represented by the arrow 310. These region-specific service requests 310 may be satisfied by any of the data centers within the regional data center system 300.

The receiving data center (i.e., the data center that receives the region-specific service request) then performs load balancing on the processing of at least some of the received region-specific service requests (act 410). For instance, there may be some reason not to perform load balancing on some region-specific service requests. For instance, some requests might be state sensitive, and rely on data or other state, that is present within a particular one of the data centers. However, for others of the region-specific service requests received by the data center, the data center performs load balancing on the processing of the region-specific service request (act 410). For instance, referring to FIG. 3A, the data center 301 performs load balancing of the processing of the incoming region-specific service requests 310.

Referring to FIG. 4, the contents of act 410 involve acts that are part of performing the load balancing of the processing of the region-specific service requests (act 410). For instance, as part of this load balancing, the receiving data center selects one or more of the data centers to actually do the processing of the region-specific service request (act 411). A selected data center will also be referred to herein as a "processing data center".

For instance, referring to FIG. 3A, the receiving data center 301 might select itself as the processing data center for some of the region-specific service requests as represented by arrow 311. Alternatively or in addition, the receiving data center 301 might also select data center 302 as a processing data center for some of the region-specific service requests and forward such region-specific service requests to the data center 302 as represented by arrow 312. The receiving data center 301 might also select data center 303 as a processing data center for some of the region-specific service requests and forward such region-specific service requests to the data center 303 as represented by arrow 313. The receiving data center 301 might also select data center 304 as a processing data center for some of the region-specific service requests and forward such region-specific service requests to the data center 304 as represented by arrow 314. The receiving data center 301 might also select data center 305 as a processing data center for some of the region-specific service requests and forward such region-specific service requests to the data center 305 as represented by arrow 315.

The receiving data center then performs load balancing in the manner in which the region-specific service request is forwarded to the processing center (act 420). For those requests that are to be handled by the processing data center, some of the requests may be dispatched via yet another data center of the regional data center, even though there is a direct communication channel between the receiving and processing data centers. For instance, the receiving data center may use a randomized or round robin two-phase communication when communicating requests to the processing data center. Such allows for more efficient utilization of bandwidth between all data centers within the regional data center system.

Referring to FIG. 4, the contents of act 420 involve acts that are part of performing the load balancing of the forwarding of the region-specific service requests to the processing data center (act 420). The level of load balancing may, for example, occur at the network level in the protocol stack. The content of act 420 may be performed for each of the one or more data centers that are to contribute to the processing of a region-specific service request.

If the processing data center is the same as the receiving data center ("Yes" in decision block 421), then the receiving data center would itself process and satisfy all or part of the region-specific service request (act 430). In that case, no substantive load balancing of the forwarding process for that portion of the request would be performed since there is no inter-data center communication involved.

If the processing data center is different than the receiving data center ("No" in decision block 421"), the receiving data center then determines if an intermediary data center is to be used in forwarding the region-specific service request (decision block 422). If not ("No" in decision block 422), then the load balancing is further performed by forwarding the region-specific request to the processing data center (act 423) without first being reflected from an intermediary data center. If the intermediary data center is to be used in forwarding the region-specific service request ("Yes" in decision block 422), the receiving data center selects the intermediary data center (act 424), and forwards the region-specific request to the intermediary data center (act 425) for reflection to the processing data center (act 423), where the region-specific service request is processed (act 430).

FIG. 3B illustrates the regional data center system 300 and the associated flows involved for region-specific service requests for which the receiving data center 301 selects the data center 304 as a processing data center. The resulting forwarding operation is abstractly represented by arrow 314 in FIG. 3A. However, FIG. 3B illustrates that there are a variety of ways to load balance the forwarding of region-specific service requests from the receiving data center 301 to the processing data center 304 at the network level of the protocol stack. The various flows in FIG. 3B will now be explained with reference to the method 400 of FIG. 400. Recall, in each case, the receiving data center 301 forwards the region-specific service request to the processing data center 304.

Arrows 322A and 322B represent a case in which data center 302 is selected as an intermediary (act 424), whereupon the service request is forwarded to the intermediary data center 302 (act 425) as represented by arrow 322A, and reflected to the processing data center 304 (act 423) as represented by arrow 322B.

Arrows 323A and 323B represent a case in which data center 303 is selected as an intermediary (act 424), whereupon the service request is forwarded to the intermediary data center 303 (act 425) as represented by arrow 323A, and reflected to the processing data center 304 (act 423) as represented by arrow 323B.

Arrow 324 represents a case in which no intermediary data center is selected ("No" in decision block 422), whereupon the region-specific service request is forwarded to the processing data center 304 (act 423) without the use of an intermediary.

Arrows 325A and 325B represent a case in which data center 305 is selected as an intermediary (act 424), whereupon the service request is forwarded to the intermediary data center 305 (act 425) as represented by arrow 325A, and reflected to the processing data center 304 (act 423) as represented by arrow 325B.

FIG. 3C illustrates the regional data center system 300 and the associated flows involved for region-specific service requests for which the receiving data center 301 selects the data center 303 as a processing data center. The resulting forwarding operation is abstractly represented by arrow 313 in FIG. 3A. However, FIG. 3C illustrates that there are a variety of ways to load balance the forwarding of region-specific service requests from the receiving data center 301 to the processing data center 303 at the network level of the protocol stack. The various flows in FIG. 3C will now be explained with reference to the method 400 of FIG. 400.

Arrows 332A and 332B represent a case in which data center 302 is selected as an intermediary (act 424), whereupon the service request is forwarded to the intermediary data center 302 (act 425) as represented by arrow 332A, and reflected to the processing data center 303 (act 423) as represented by arrow 332B.

Arrow 333 represents a case in which no intermediary data center is selected ("No" in decision block 422), whereupon the region-specific service request is forwarded to the processing data center 303 (act 423) without the use of an intermediary.

Arrows 334A and 334B represent a case in which data center 304 is selected as an intermediary (act 424), whereupon the service request is forwarded to the intermediary data center 304 (act 425) as represented by arrow 334A, and reflected to the processing data center 303 (act 423) as represented by arrow 334B.

Arrows 335A and 335B represent a case in which data center 305 is selected as an intermediary (act 424), whereupon the service request is forwarded to the intermediary data center 305 (act 425) as represented by arrow 335A, and reflected to the processing data center 303 (act 423) as represented by arrow 335B.

Figure 5:
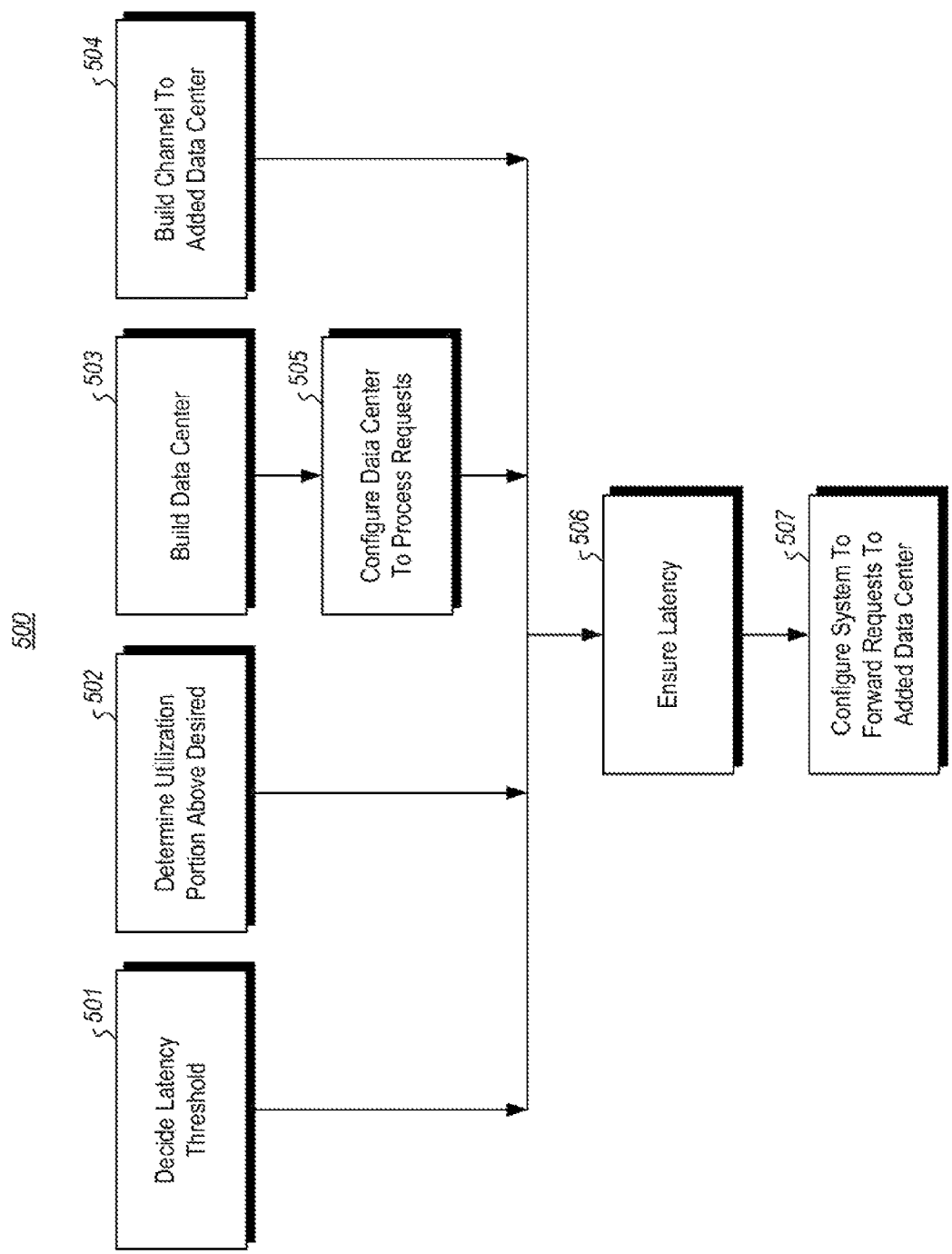
FIG. 5 illustrates a flowchart of a method for adding additional data centers to the regional data center system.

As previously mentioned, in the example of FIGS. 3A through 3C, perhaps data center 301 was the original data center servicing a particular region, and then later data centers 302 through 305 were added to meet demand. FIG. 5 illustrates a flowchart of a method 500 for augmenting a number of data centers in a regional data center system serving region-specific service requests corresponding to a particular region.

The latency threshold to be tolerated in the particular region is decided upon (act 501). For instance, this latency threshold may be any value acceptable to the owner or administrator of the regional data center system, but is in one embodiment, a few milliseconds or less.

The method 300 also includes determining that the one or more existing data centers are above a utilization ratio (act 502). This determination should preferably be made soon enough that preparations can be made to perform the remainder of the method 500 prior to the existing data centers being fully utilized. This act 502 is shown in parallel with the deciding of the latency threshold (act 501) as there is no temporal dependency between the acts 501 and 502.

Optionally, the method 300 also includes building an additional data center (act 503). This building (act 503) is shown in parallel with the deciding of the latency threshold (act 501) and the determining of the utilization ratio as there is no strict temporal dependency between the acts 501, 502, and 503, except those already noted in that it is preferred that act 502 occur well in advance so that act 503, if necessary, may be performed before full utilization of existing data center(s) has been reached.

The method 500 also includes configuring the additional data center to process region-specific service requests corresponding to the particular region (act 505). This does not mean that the additional data center actually receives such requests, only that it is capable of processing such requests if they are received.

Optionally, the method 500 also includes actually establishing at least a portion of one or more communication channels between the additional data center and the one or more existing data centers of the regional data center system (act 504). Again, there is no strict temporal relationship between this act 504 and the other acts 501 through 503, and thus this act is again shown in parallel.

The method 500 also includes measuring a network latency between the additional data center and one or more existing data centers of the regional data center system to ensure that the latency of the additional data center is below the latency threshold (act 506). Once this is ensured, the regional data center as a whole may be configured so that at least some of the region-specific service requests received by the regional data center system are routed to the additional data center for processing (act 507).

Accordingly, a regional data center system is described in which the system may appear externally as a single data center. Furthermore, the data center may be dynamically augmented with additional data centers as demand increases. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a plurality of data centers of a data center system configured such that any request for services corresponding to the data center system may be satisfied by any of the plurality of data centers, the plurality of data centers including at least a first, a second, and a third data center;
   wherein the first data center is configured to reflect one or more requests corresponding to the data center system and received by the first data center, including the first data center being configured to perform at least the following:
   for at least one of the requests received by the first data center, determine that the at least one request is to be processed by the second data center;
   determine that the at least one request is to be reflected through the third data center, rather than being sent to the second data directly; and
   forward the at least one request to the third data center, for reflection by the third data center to the second data center.

2. The system in accordance with claim 1, wherein the first data center is also configured to determine, for at least one other of the requests received by the first data center, that the at least one other of the requests is also to be processed by the second data center, but that the at least one other request is to be forwarded to the second data center directly, without first being reflected through the third data center.

3. The system in accordance with claim 1, wherein the first data center is also configured to determine, for at least one other of the requests received by the first data center, that the at least one other of the requests is to be processed by the first data center, itself, without using the second or third data center.

4. The system in accordance with claim 1, wherein the first data center is also configured to perform at least the following:
   for at least one other of the requests received by the first data center, determine that the at least one other request is to be processed by the third data center;
   determine that the at least one other request is to be reflected through the second data center, rather than being sent to the third data directly; and
   forward the at least one other request to the second data center, for reflection by the second data center to the third data center.

5. The system in accordance with claim 1, wherein each of the first, second and third data centers operate within a latency envelope in which a probability that communications between any of the data centers will occur below a defined latency is verified to be within a particular probability threshold.

6. The system in accordance with claim 1, wherein the first data center is configured to perform the load balancing at a network layer in a protocol stack.

7. The system in accordance with claim 1, wherein the first data center is also configured to determine that reflecting the at least one request through the third data center utilizes available bandwidth more efficiently than forwarding the at least one request to the second data center directly, as part of determining that the at least one request is to be reflected through the third data center, rather than being sent to the second data directly.

8. The system in accordance with claim 1, wherein the first data center is also configured to determine that the second data center possesses state information needed by the at least one request, as part of determining that the at least one request is to be processed by the second data center.

9. The system in accordance with claim 1, wherein the first data center is also configured to that no prior state information is needed by the at least one request, as part of determining that the at least one request is to be processed by the second data center.

10. The system in accordance with claim 1, wherein the data center system comprises data centers of a particular geographic region, and wherein the one or more requests comprise one or more region-specific requests originating from within the particular geographic region.

11. A method, implemented at a first data center in a computing environment comprising a plurality of data centers of a data center system, such that any service request corresponding to the data center system may be satisfied by any of the plurality of data centers, the plurality of data centers including at least the first, a second, and a third data center, a method of performing reflection on a plurality of service requests corresponding to the data center system and received by the first data center, the method comprising:
for at least one of the received plurality of service requests, determining that the at least one service request is to be processed by the second data center;
determining that the at least one service request is to be reflected through the third data center, rather than being sent to the second data directly; and
forwarding the at least one service request to the third data center, for reflection by the third data center to the second data center.

12. The method in accordance with claim 11, further comprising:
for at least one other of the received plurality of service requests, determining that the at least one other of the service requests is also to be processed by the second data center; and
forwarding the at least one other service request to the second data center directly, without first being reflected through the third data center.

13. The method in accordance with claim 11, further comprising, for at least one other of the received plurality of service requests, processing the at least one other service request by the first data center, itself.

14. The method in accordance with claim 11, further comprising:
for at least one other of the received plurality of service requests, determining that the at least on other service request is to be processed by the third data center;
determining that the at least one other service request is to be reflected through the second data center, rather than being sent to the third data directly; and
forwarding the at least one other service request to the second data center, for reflection by the second data center to the third data center.

15. The method in accordance with claim 11, wherein each of the first, second and third data centers operate within a latency envelope in which a probability the communications between any of the data centers will occur below a defined latency is verified to within a particular probability threshold.

16. The method in accordance with claim 11, wherein the first data center performs the load balancing at a network layer in a protocol stack.

17. The method in accordance with claim 11, wherein determining that the at least one service request is to be reflected through the third data center, rather than being sent to the second data directly, comprises determining that reflecting the at least one service request through the third data center utilizes available bandwidth more efficiently than forwarding the at least one service request to the second data center directly.

18. The method in accordance with claim 11, wherein determining that the at least one service request is to be processed by the second data center comprises determining that the second data center possesses state information needed by the at least one service request.

19. The method in accordance with claim 11, wherein determining that the at least one service request is to be processed by the second data center comprises determining that no prior state information is needed by the at least one service request.

20. The method in accordance with claim 11, wherein the data center system comprises data centers of a particular geographic region, and wherein the one or more requests comprise one or more region-specific requests originating from within the particular geographic region.

21. A computer program product for use by a first data center in a computing environment comprising a plurality of data centers of a data center system configured such that any request for services corresponding to the data center system may be satisfied by any of the plurality of data centers, the plurality of data centers including at least the first, a second, and a third data center, the computer program product comprising one or more hardware storage devices having stored thereon computer-executable instructions that are configured to be executed by one or more processors within the first data center, and to configure the first data center to perform at least the following:
for at least one received service request, determine that the at least one service request is to be processed by the second data center;
determine that the at least one service request is to be reflected through the third data center, rather than being sent to the second data directly; and
forward the at least one service request to the third data center, for reflection by the third data center to the second data center.

22. The computer program product in accordance with claim 21, wherein the data center system comprises data centers of a particular geographic region, and wherein the one or more requests comprise one or more region-specific requests originating from within the particular geographic region.

* * * * *